May 30, 1967 W. R. PECK ET AL 3,322,109
PARACHUTE DEPLOYMENT APPARATUS
Filed April 19, 1965 4 Sheets-Sheet 2

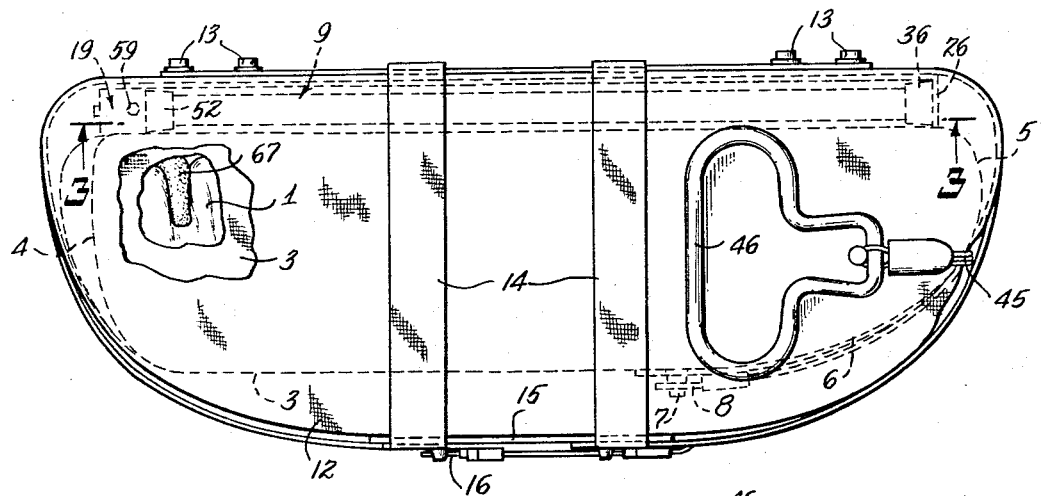
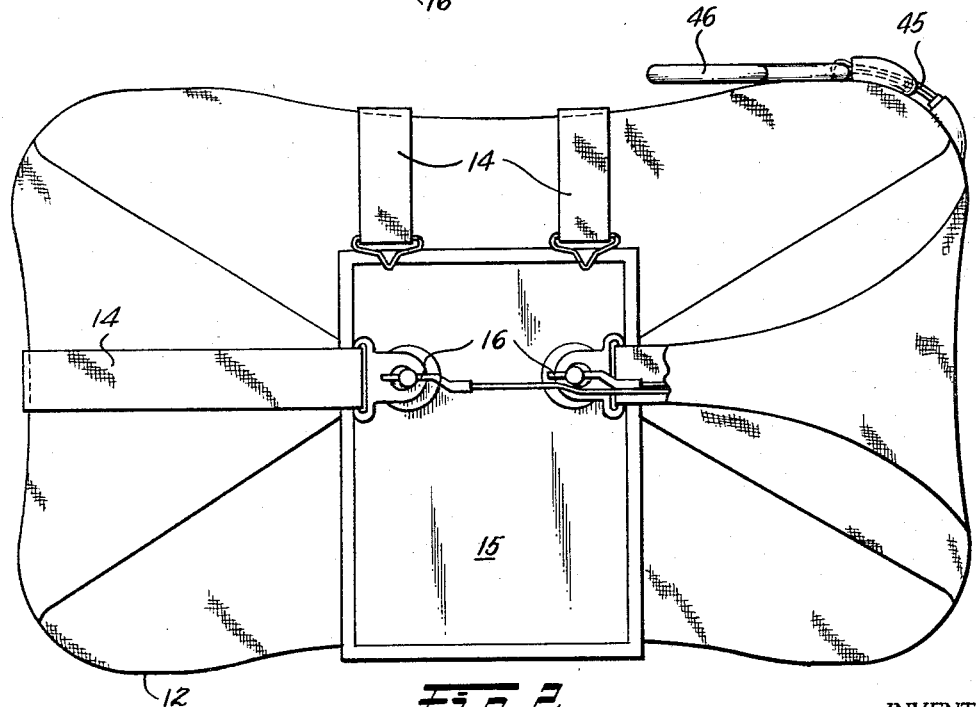

INVENTORS
WALTER R. PECK
RICHARD R. HIGGINS
BY *Arnold & Roylance*
ATTORNEYS

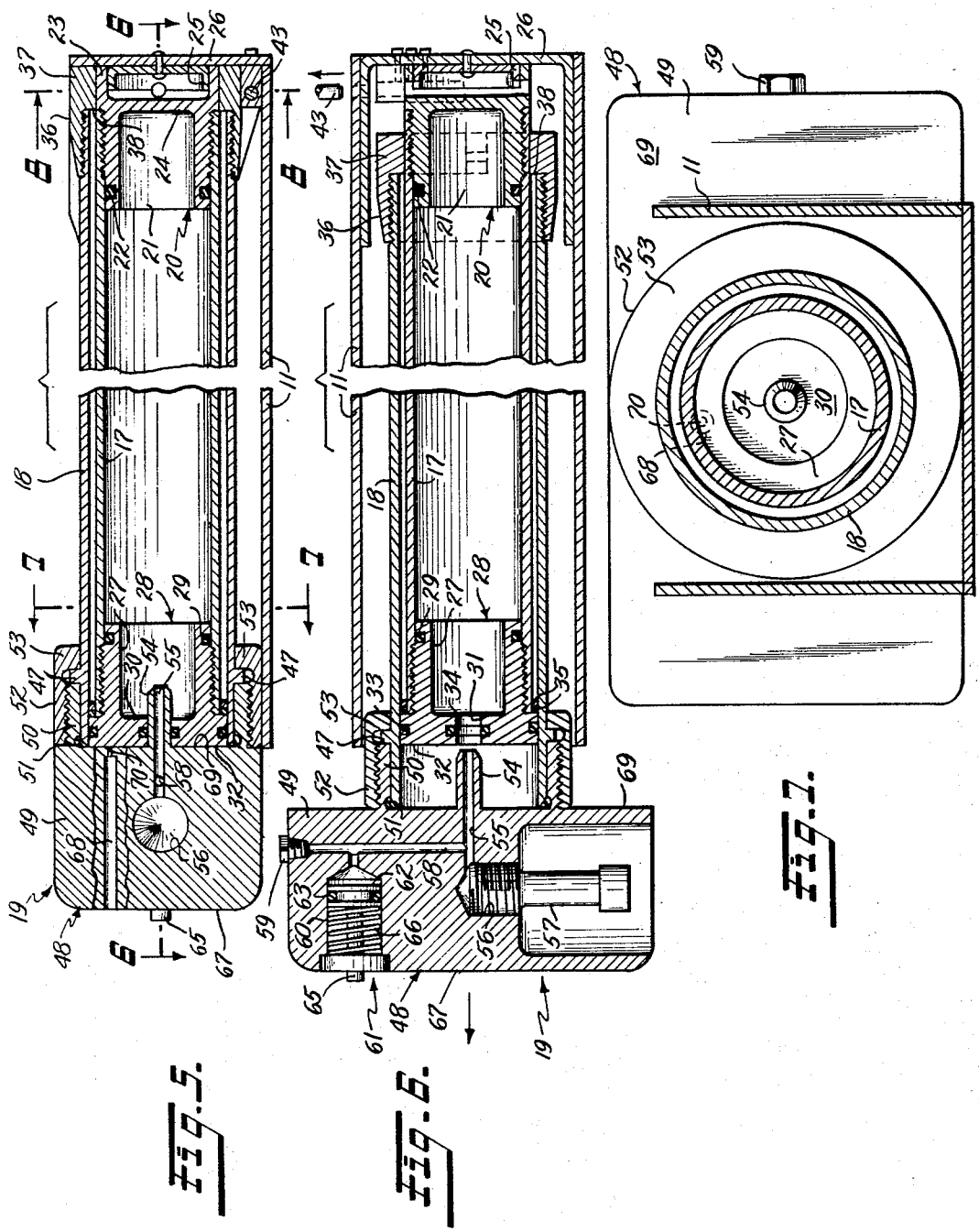

May 30, 1967  W. R. PECK ET AL  3,322,109
PARACHUTE DEPLOYMENT APPARATUS
Filed April 19, 1965  4 Sheets-Sheet 4
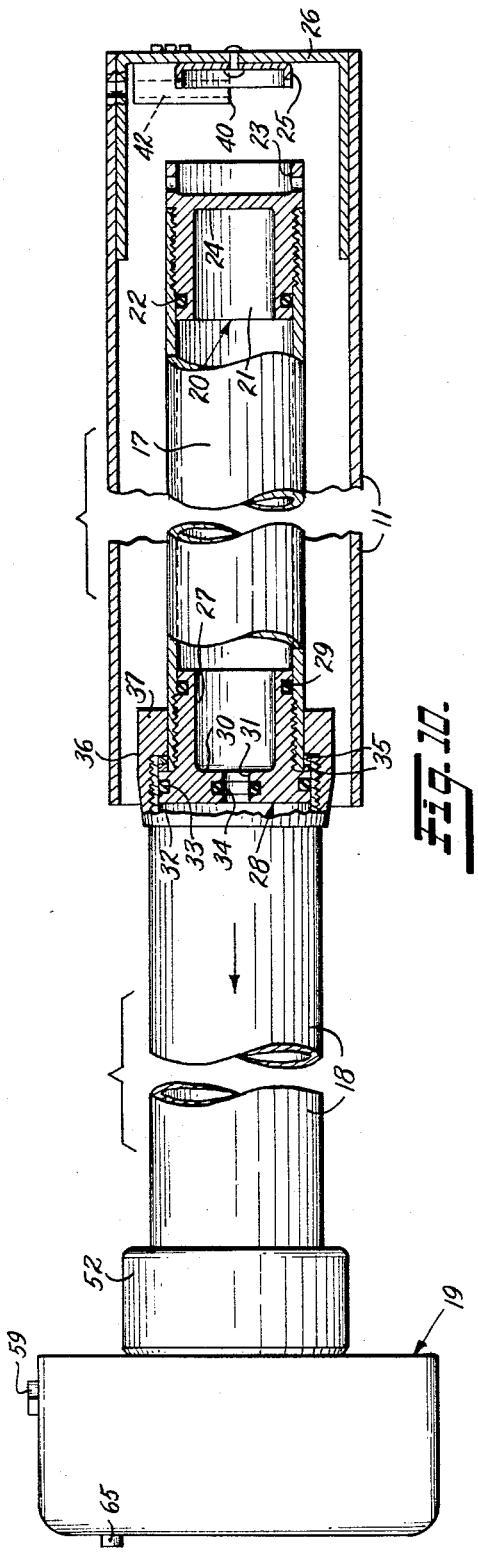
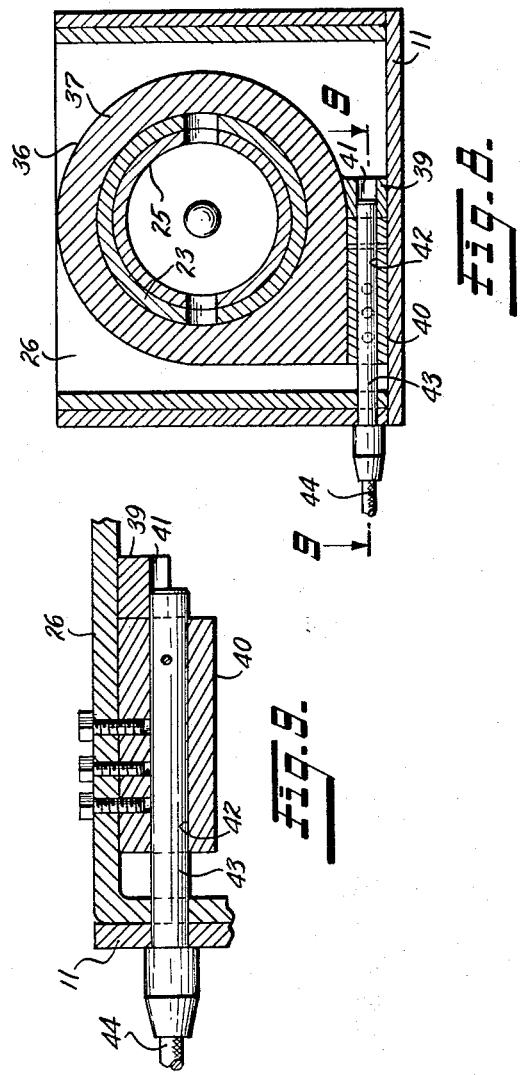
INVENTORS
WALTER R. PECK
RICHARD R. HIGGINS
BY Arnold & Roylance
ATTORNEYS

United States Patent Office 3,322,109
Patented May 30, 1967

3,322,109
PARACHUTE DEPLOYMENT APPARATUS
Walter R. Peck and Richard R. Higgins, Asheville, N.C., assignors to Stencel Aero Engineering Corporation, Arden, N.C., a corporation of North Carolina
Filed Apr. 19, 1965, Ser. No. 449,134
10 Claims. (Cl. 124—11)

ABSTRACT OF THE DISCLOSURE

A general purpose deployment gun releasably disposed on a support and including two telescopically arranged tubular members which define an expansible chamber for receiving a gas under pressure. A pull pin cooperates with one of the members and the support to releasably secure the two members in a fully telescopically collapsed position to the support. When the pin is withdrawn, the two members move relative to each other under the influence of the pressurized gas to a telescopically extended position, the combination of the telescopically extended members moving as a unit away from the support after the limit of telescopic extension has been reached.

---

This invention relates to power deployed parachute apparatus and, more particularly, to improved power operated projecting or deploying devices therefor. The invention is particularly applicable to parachute apparatus of the type disclosed in copending application Ser. No. 449,236, now Patent No. 3,286,959, filed concurrently herewith by Fred B. Stencel.

As disclosed in said Patent 3,286,959 it is desirable to equip certain types of parachute apparatus with a ballistic projecting or deploying device, hereinafter referred to as a deployment gun, which is capable of projecting a fully packed parachute canopy with such momentum that the canopy pack will travel a substantial distance and the canopy will then be extracted from the pack and brought to a fully stretched out or deployed condition. Power adequate for deployment of the canopy in this fashion can be supplied readily by various types of explosive or pyrotechnic devices but, particularly for military purposes, such sources of power have the drawback of requiring that an adequate supply of the explosive or pyrotechnic devices be maintained and checked periodically to be sure that, in storage, the devices remain operative.

A general object of the invention is to provide a deployment gun which is powered by a compressed gas charge introduced directly to the gun itself preparatory to use, so that storage of a power source is not required.

Another object is to devise a deployment gun of the type described which, after being charged with gas under pressure, can be held ready for firing by action of a simple pin or like retainer with the pin or the like being subjected only to forces which are small in comparison to the projection impulse to be generated by the gun.

A further object is to provide a deployment gun characterized by both simplicity and a very high degree of dependability.

In broad terms, the invention provides a deployment gun which includes two telescopically interengaged tubular members which define an expansible chamber into which a gas, such as nitrogen, air, etc., can be charged under high pressures (e.g., 1500–1800 lbs. per sq. in.), the two members being held initially in a fully collapsed condition by a pull pin but being telescopically extendable under influence of the gas pressure once the pin has been released, the two members being so interrelated that, when fully telescoped to collapsed condition, only a relatively small equivalent pressure differential exists tending to cause movement toward the extended condition. Thus, for example, the structure can be such that, though the full pressure of the compressed gas charge is on the order of 1800 lbs. per sq. in., the pull pin is subjected only to a force equivalent to that generated by about 40 lbs. per sq. in. pressure, so that the pull pin can be released with ease and certainty. Then, as relative movement toward extended condition occurs, the two tubular members become so interrelated that the full pressure of the compressed gas charge is applied to operate the gun.

In order that the manner in which the foregoing and other objects are attained in accordance with the invention can be understood in detail, one particularly advantageous embodiment of the invention will be described with reference to the accompanying drawings, which form a part of this specification, and wherein:

FIG. 1 is a top plan view of a fully packed parachute apparatus in accordance with the invention;

FIG. 2 is a front elevational view of the fully packed parachute apparatus of FIG. 1;

FIG. 5 is a longitudinal sectional view of the deployment gun of the apparatus of FIG. 1, showing the parts of the gun in their initial, fully telescoped relation as retained by the pull pin prior to firing of the gun;

FIG. 6 is a view taken generally on line 6—6, FIG. 5, but showing the parts of the gun in relative positions which exist immediately after release of the pull pin to fire the gun;

FIG. 7 is a transverse sectional view taken on line 7—7, FIG. 5;

FIG. 8 is a transverse sectional view taken on line 8—8, FIG. 5;

FIG. 9 is a fragmentary sectional view taken on line 9—9, FIG. 8; and

FIG. 10 is a view, partly in side elevation and partly in longitudinal section, illustrating the parts of the gun in fully extended condition with the gun now accelerated in projection away from the supporting bracket on which it was initially retained.

Figure 3:
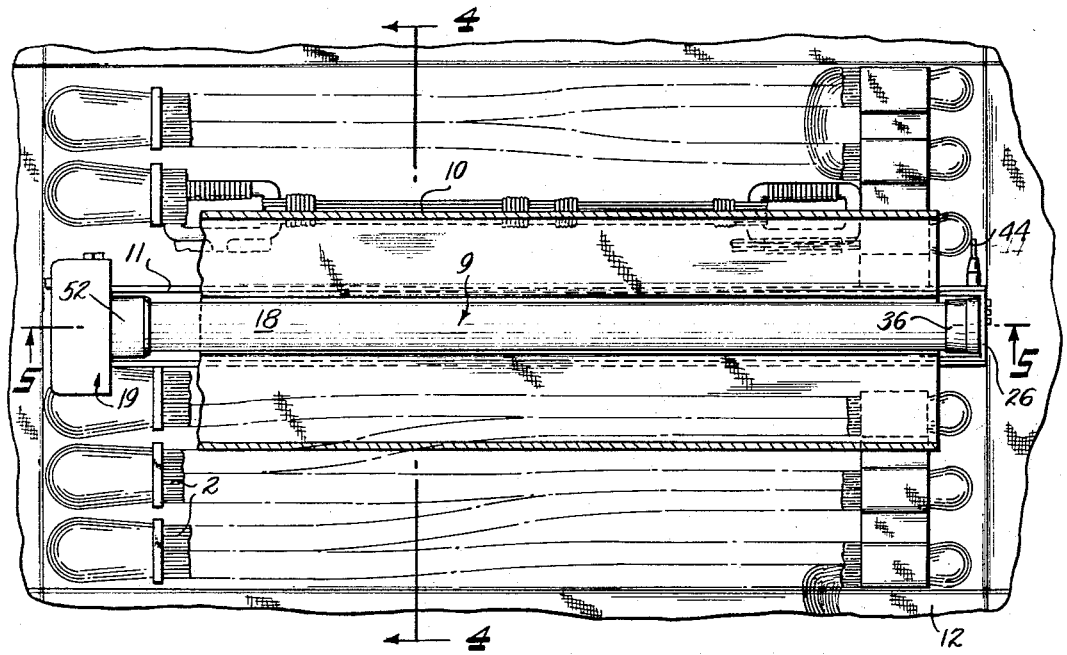
FIG. 3 is a fragmentary elevational view, with parts broken away for clarity, taken generally on line 3—3, FIG. 1.
Figure 4:
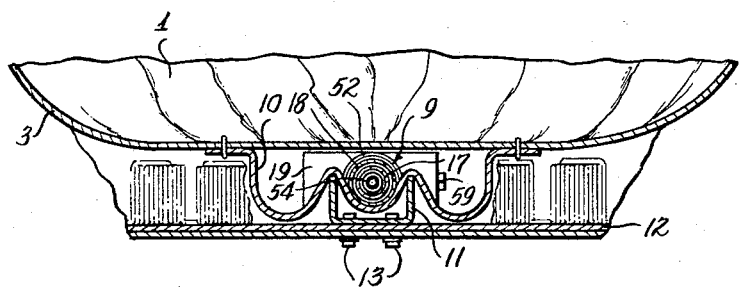
FIG. 4 is a fragmentary transverse sectional view taken on line 4—4, FIG. 3.

Turning now to the drawings in detail, the invention is shown as applied to a secondary or reserve parachute of the type described and claimed in copending application Ser. No. 449,236, filed concurrently herewith by Fred B. Stencel, now Patent 3,286,959. The parachute comprises a main canopy 1 provided with suspension lines 2 for connection to the load (not shown) to be recovered. The main canopy is packed in and completely enclosed by a deployment bag 3 which has a closed leading end 4 and a trailing end 5 provided with a closure flap 6 initially secured by the combination of closing cone 7 and pin 8. Constructed in accordance with one particularly advantageous embodiment of the invention, the deployment or projection gun indicated generally at 9 (FIGS. 3 and 4) is disposed within a pouch 10 secured to the outer surface of bag 3 and positioned by a bracket 11 which is secured to the inner surface of an outer bag 12, as by fasteners 13. The outer bag 12 encloses deployment bags 3, gun 9 and suspension lines 2, the latter being stowed between the outer bag and the deployment bag at both sides of bracket 11, as seen in FIGS. 3 and 4. With the parachute properly packed, the outer bag 12 is closed by the combination of straps 14, panel 15 and the rip cord pins 16.

In FIGS. 5 and 6, gun 9 includes two telescopically engaged tubular members 17 and 18 and a header assembly 19. The inner tubular member 17 is closed at one end by a cylindrical plug 20 having an externally threaded portion 21 in screw-thread engagement with the internally threaded end portion of member 17, an O-ring seal being provided at 22 to prevent escape of fluid past the plug. A cylindrical skirt 23 projects axially from the transverse wall 24 of plug 20 for slidable telescopic engagement with a cup-shaped positioning element 25 secured to the transverse end wall 26 of bracket 11.

Member 17 is internally threaded at its other end to retain the externally threaded cylindrical tubular shank 27 of an end member 28, an O-ring seal 29 being provided at the tip of shank 27. Member 28 includes a transverse wall 30 having a central, cylindrical aperture 31 which is concentric with the central axis of member 17. Wall 30 projects outwardly to define a transverse annular shoulder portion 32 which has a groove in its cylindrical periphery to accommodate an O-ring 33. The cylindrical wall of aperture 31 is provided with a groove to accommodate an O-ring 34. Immediately adjacent shoulder portion 32, a pair of stop rings 35 surround the outer surface of member 17.

The end portion of member 18 which telescopically embraces member 17 is externally threaded to retain the internally threaded shank of a ring 36. Beyond member 18, ring 36 has an inwardly projecting transverse annular shoulder portion 37 presenting an inner peripheral surface which slidably embraces member 17, and an annular shoulder surface 38 disposed to engage the adjacent stop ring 35 when the two tubular members are fully extended telescopically (FIG. 10). As seen in FIGS. 5, 6 and 8, ring 36 includes an integrally formed outwardly projecting portion 39 which is notched to accommodate a block 40 secured to end wall 26 of bracket 11 and which includes a semi-cylindrical groove 41, FIG. 8, disposed to be in precise coaxial alignment with a bore 42 in block 40 when the gun is fully assembled on bracket 11 preparatory to use. As later described, bore 42 and groove 41 receive the firing pin 43 attached to a firing lanyard 44 which is run out of bag 12 with the rip cord assembly 45, both the firing lanyard and the rip cord assembly being attached to a pull ring 46 (FIG. 1).

The other end portion of member 18 is provided with an outwardly projecting transverse annular shoulder 47. Header assembly 19 includes a header member 48 having a main body portion 49 and, formed integrally therewith, a cylindrical tubular projection 50 which is engaged over the end of member 18 and abuts shoulder 47. An O-ring seal is provided at 51 to prevent escape of fluid between member 18 and projection 50. Projection 50 is externally threaded and an internally threaded clamping ring 52 is engaged therewith, the clamping ring having an inwardly projecting transverse annular shoulder 53 engaging shoulder 47 on the side thereof opposite projection 50.

Within projection 50, there extends from body portion 49 an integrally formed smaller tubular projection 54, projections 50 and 54 being concentric and projection 54 having an outer diameter such as to be slidably received in aperture 31, with O-ring 34 establishing a fluid-tight seal with the outer surface of projection 54. Body portion 49 has an axial bore 55 which forms an extension of the interior of projection 54 and which communicates with a larger, threaded, transverse bore 56 in which is secured a combination check valve and connector fitting 57 by means of which a source (not shown) of compressed gas under high pressure can be connected to supply a charge of power fluid via bore 55 to the expansible chamber defined by the combination of members 17 and 18, plug 20 and header assembly 19. A second transverse bore 58, FIG. 6, closed at its outer end by plug 59, communicates with bore 55.

A recess 60 opens into bore 58 and accommodates a feeler device indicated generally at 61. Device 61 includes a piston 62 having a grooved periphery to accommodate O-ring 63 for establishing fluid-tight seal between the piston and the cylindrical wall of recess 60. The mouth of recess 60 is closed by a fixed ring 64 having a central aperture through which a feeler pin 65 can extend. Pin 65 is fixed rigidly to piston 62. A helical compression spring 66 surrounds pin 65 and is engaged between the fixed closure ring 64 and the body of the piston 62. When the gun is properly charged with fluid under pressure, the pressure fluid acts, via bores 55 and 58, to force piston 62 forwardly, against the biasing action of spring 66, so that pin 65 projects forwardly from the leading face 67 of body portion 49. Observation of whether or not pin 65 projects beyond face 67, either visually or by touch, indicates whether or not the gun is properly charged.

It will be noted that members 17 and 18 are relatively movable, in an axial direction, between the fully telescoped position of FIG. 5 and the fully extended position of FIG. 10. With members 17 and 18 fully telescoped, the gun can be assembled by engaging skirt 23 over positioning element 25 and inserting firing pin 43 (FIG. 5) through bore 42 and into engagement in groove 41. With the parts so assembled, engagement of the tip of skirt 23 with the end wall 26 of bracket 11 prevents movement of member 17 to the right, as viewed in FIG. 5, while engagement of the firing pin in groove 41 prevents movement of member 18 to the left, as viewed in FIG. 5. Thus, members 17 and 18 are held rigidly on bracket 11. The gun can now be charged with compressed nitrogen or other suitable compressible power fluid via fitting 57 and bore 55. This can be done at any convenient time, before or after bracket 11 is secured to outer bag 12, and the charged gun can be stored indefinitely.

With members 17 and 18 in the fully telescoped condition shown in FIG. 5, projection 54 extends completely through aperture 31 and, a fluid-tight seal being provided by O-ring 34, the pressure fluid within the gun can act only on a relatively small surface (the area of the circular cross section of aperture 31) carried by the combination of member 18 and header assembly 19. Accordingly, though the fluid pressure within member 17 is large (say 1500 pounds per square inch), the structure provides what can be termed a differential piston effect which limits the force actually applied to the combination of member 18 and the header assembly 19 to a small value (say 40 pounds), this likewise being the force applied to the firing pin.

When ring 46 is pulled to release rip cord pins 16, opening outer bag 12, and to pull the firing pin 43 from engagement with groove 41, the combination of member 18 and header assembly 19 is released to move to the left, as viewed in FIG. 5, though member 17 is held against movement in the opposite direction because of its engagement with wall 26 of bracket 11. In a manner similar to that shown in FIGS. 5–7 of the above-mentioned Stencel Patent 3,286,959, header assembly 19 bears against the end of pouch 10 to carry the pouch and outer bag 3 secured thereto with it. Initial movement of member 18 and header assembly 19 is caused, not by the force equivalent to the full pressure of the charge, but by the reduced force resulting because of the difference in surface areas presented by plug 20 and projection 54. Accordingly, the combination of member 18 and header assembly 19, with the canopy 1 and bag 3 carried therewith, is accelerated at a relatively slow rate, until projection 54 is withdrawn from aperture 31, as seen in FIG. 6. Since the compressed gas can now escape from member 17 through aperture 31 into member 18, the full pressure of the compressed charge is now applied to the member 18 and assembly 19 so that these members, along with canopy 1 and bag 3, are now rapidly accelerated. Tubular member 18 slides over member 17 until shoulder surface 38 engages stop rings 35, as seen in FIG. 10. No further telescopic extension of members 17 and 18 can now occur, and member 17 therefore travels in projected flight with member 18. In this connection, it will be understood that skirt 23 is simply withdrawn from element 25, and that the entire bracket 11 remains attached to the load to be recovered by the parachute, as does outer bag 12, while the canopy 1, bag 3 and gun 9 continue in projected flight until the canopy is fully deployed in the manner described in aforementioned copending application Ser. No. 449,236 now Patent 3,286,959. While gun 9 has been described in the context of projecting a secondary parachute, it will be apparent to those skilled in the art that the gun of this invention is a general purpose projection apparatus.

To assure that the firing pin 43 will be under only a relatively small clamping force even in the event of leakage around projection 54, particularly when the gun is stored in charged condition, body portion 49 of the header member is provided with a longitudinal bore 68, FIGS. 5 and 7, which opens through the leading face 67 and, at its other end, opens through the trailing face 69 via a small aperture 70. Assuming that a full operating fluid pressure exists within member 17 and that members 17 and 18 are held in the fully telescoped position of FIG. 5 by firing pin 43, any leakage of pressure fluid past O-ring 34 will be relieved because of the escape of the fluid via aperture 70. Thus, there will be no pressure build-up between wall 30 and surface 69 and, therefore, the relatively small clamping force between the firing pin and portion 39 of ring 36 will not be significantly increased. In this connection, it is significant that, because of maintenance of such a low clamping force, the firing pin could be withdrawn manually in event of failure of the firing lanyard.

Gun 9 is recoverable, along with bag 3, as by auxiliary parachute 67, FIG. 1, for reuse. Since the firing pin 43 holds against only a relatively small pressure and is therefore not damaged in use, it too can be reused.

Though one particularly advantageous embodiment of the invention has been chosen for illustrative purposes, it will be understood by those skilled in the art that various changes and modifications therein can be made without departing from the scope of the invention as defined in the appended claims.

What is claimed is:

1. In apparatus of the type described, the combination of
   support means;
   a first tubular member having a closed end adapted to engage said support means;
   a second tubular member having a closed end,
      said first and second tubular members being slidably engaged telescopically to define an expansible chamber for receiving a charge of compressed gas and being relatively movable between an initially telescopically collapsed position and a telescopically extended position,
      said first and second tubular members having cooperating abutment means disposed to limit telescopic extension thereof and thereby determine said telescopically extended position;
   valved means carried by one of said tubular members whereby compressed gas can be admitted to said chamber; and
   a release member,
      said support means and one of said tubular members having cooperating means for receiving said release member, and said release member being initially releasably engaged with said cooperating means to secure said first and second tubular members to said support means in said initially telescopically collapsed position,
      withdrawal of said release member freeing said tubular members for relative movement to said extended position and also freeing the telescopically engaged combination of said first and second tubular members for movement away from said support means.

2. Apparatus according to claim 1, wherein
   one of said tubular members is provided, at its end portion opposite the closed end thereof, with transverse internal means defining an aperture having a transverse area which is small as compared to the transverse internal dimensions of said tubular members, and
   the other of said tubular members is provided with a plug member slidably extending through said aperture when said members are in said initially telescopically collapsed position,
      said plug member constituting the only portion of said other tubular member exposed to fluid pressure in said chamber when said members are in said initially telescoped position.

3. In apparatus of the type described, the combination of
   support means including an abutment;
   a first tubular member having a closed end and a transverse wall at the end portion thereof opposite said closed end, said transverse end wall having an aperture;
   a second tubular member having a closed end and an open end portion engaged telescopically over said closed end of said first tubular member,
      said closed end of said second tubular member having a projection aligned coaxially with said aperture,
      said tubular members being movable between an initial fully telescopically collapsed position, in which said projection extends within and occupies said aperture, and a telescopically extended position, said tubular members having cooperating stop means disposed to limit telescopic extension of said members and thereby determine said extended position;
   valved means whereby a power fluid under pressure can be admitted to the chamber defined by said tubular members; and
   releasable means for securing said tubular members to said support means in said fully telescopically collapsed position,
      release of said releasable means freeing said tubular members to allow expansion of the power fluid and resultant acceleration of said second tubular member to said telescopically extended position while said closed end of said first tubular member engages said abutment,
      engagement of said stop means causing said first tubular member to be accelerated away from said support means with said second tubular member.

4. Apparatus according to claim 3, wherein
   said projection is provided with a through bore communicating with said valved means.

5. In an apparatus for projecting a load, the combination of
   support means;
   a first tubular member having a closed end engageable with said support means to prevent movement of said first tubular member in a direction from the other end thereof to said closed end;
   a second tubular member slidably and telescopically engaged with said first tubular member,
      said tubular members defining an expansible chamber and said second tubular member being movable, relative to said first tubular member, between an initial fully telescopically collapsed position and telescopically extended position,
      said tubular members having cooperating stop means engageable to limit telescopic extension thereof and thereby determine said telescopically extended position;
   valved means for admitting compressed power fluid to the space defined by said tubular members; and
   means releasably securing said tubular members to said support means with said tubular members in said fully telescopically collapsed position, release of said releasable means freeing said tubular members to allow movement of said second tubular member to said telescopically extended position under the influence of the power fluid contained by said tubular members, engagement of said stop means then causing said first tubular member to move with said second tubular member away from said support means.

6. In an apparatus for projecting a load, the combination of support means;

two tubular members, one of said tubular members having a closed end and an opposite end portion telescopically engaged over the other of said tubular members, said other tubular member having a closed end and an opposite end, said opposite end being provided with a transverse wall having an aperture, said closed end of said one tubular member being provided with a projection aligned with said aperture, said tubular members being relatively movable telescopically between a fully telescopically collapsed position, in which said projection is slidably engaged in and effectively occupies said aperture, and a telescopically extended position, said tubular members having cooperating stop means operative to limit telescopic extension of said members and thereby determine said second position;

first means for releasably securing said tubular members to said support means while in said fully telescopically collapsed position;

positioning means carried by said support means and releasably engageable with the closed end of one of said tubular members; and valved means whereby a charge of compressed power fluid can be introduced into the chamber defined by said tubular members.

7. In an apparatus for projecting a load, the combination of support means including an abutment;

two telescopically engaged tubular members releasably carried by said support means each telescopically collapsed having an outer end;

a header secured to and closing the outer end of one of said tubular members, the outer end of the other of said tubular members being closed, said header being provided with valved means for introducing a charge of compressed power fluid into the space defined by said tubular members; and releasable means for securing said tubular members against relative axial movement in an initial telescoped position, the closed outer end of said other tubular member being engageable with said abutment, release of said releasable means then allowing the compressed power fluid to accelerate said one tubular member in a direction telescopically extending said members, said tubular members having cooperating stop means engageable, as said members are telescopically extended, to cause said other tubular member to be carried with said one tubular member away from said support means in projected flight with said header leading and said closed outer end of said other member trailing.

8. The apparatus according to claim 1, further comprising: means communicating with said chamber for indicating whether the gas is under sufficient pressure to cause said first and second tubular members to be moved to said extended position and away from said support means.

9. The apparatus according to claim 4, further comprising: means coupled to said through bore in said projection and communicating with said chamber defined by said tubular members for indicating whether the power fluid is under sufficient pressure to cause said first and second tubular members to be accelerated to the second position and to be accelerated away from said support means.

10. The apparatus according to claim 7, wherein said header is provided with an indicator device, which is responsive to the fluid in said chamber defined by said tubular members, for indicating whether the fluid is under a pressure of sufficient magnitude to cause said tubular members to be accelerated to the extended position and to be accelerated in said projected flight.

References Cited

UNITED STATES PATENTS

| | | | |
|---|---|---|---|
| 2,642,056 | 6/1953 | Harris | 124—30 |
| 2,924,211 | 2/1960 | McSwain | 124—30 X |
| 3,097,819 | 7/1963 | Raistakka | 244—147 X |

RICHARD C. PINKHAM, *Primary Examiner.*

ANTON O. OECHSLE, *Examiner.*

W. R. BROWNE, *Assistant Examiner.*